(No Model.)

J. T. ELLIS.
HAND OR FOOT WARMER.

No. 444,395. Patented Jan. 6, 1891.

WITNESSES: Oscar A. Michel, E. L. Sherman

INVENTOR Jonathan T. Ellis,
BY Draket & , ATTY'S.

UNITED STATES PATENT OFFICE.

JONATHAN T. ELLIS, OF NEWARK, NEW JERSEY, ASSIGNOR TO EMBURY McLEAN, OF NEW YORK, N. Y.

HAND OR FOOT WARMER.

SPECIFICATION forming part of Letters Patent No. 444,395, dated January 6, 1891.

Application filed February 4, 1890. Serial No. 339,210. (No model.)

To all whom it may concern:

Be it known that I, JONATHAN T. ELLIS, a citizen of the United States, residing at Newark, in the county of Essex and State of New Jersey, have invented certain new and useful Improvements in Hand or Foot Warmers; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The object of this invention is to provide a more efficient and convenient warming device for the pocket, or one that is sufficiently small to be easily portable and applicable to the face or other portion of the human body requiring warmth or a special application of heat for the purpose of reducing or alleviating pain or for other remedial purposes.

More specific objects will be stated in connection with the description of the device.

The invention consists in the improved portable warming device and in the arrangements and combinations of parts, substantially as will be hereinafter set forth, and finally embodied in the clauses of the claim.

Figure 2:
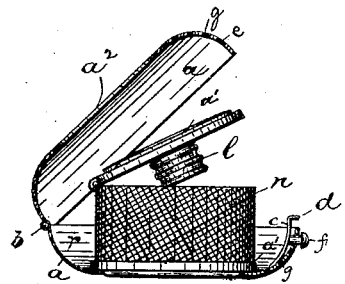
Figure 1:
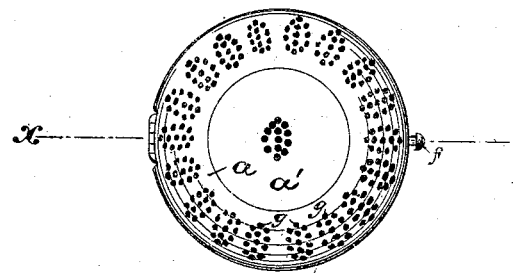
Figure 3:
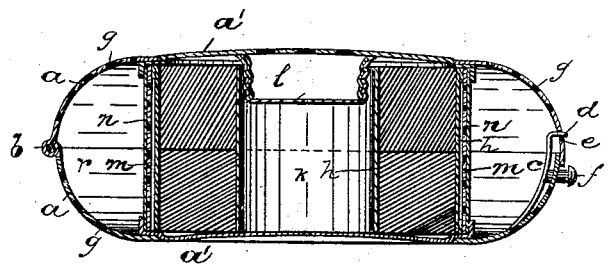
Figure 4:
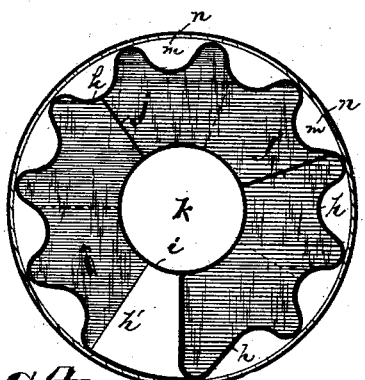
Figure 5:
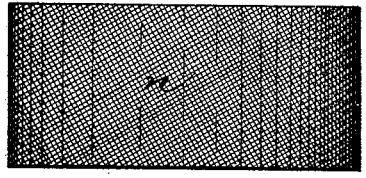
Figure 6:
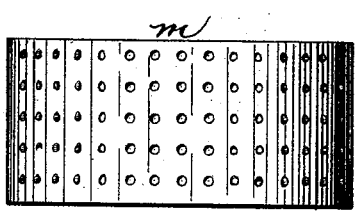

Referring to the accompanying drawings, in which like letters of reference indicate corresponding parts in each of the several figures, Figure 1 is a plan of the device. Fig. 2 is a section of the outer casing thereof, the same being opened and certain of the interior parts being shown in side elevation. Fig. 3 is a sectional view of the whole device, the parts being in a closed relation. Fig. 4 is a detail plan of a fuel-box. Fig. 5 is a side view of a cylindrical outer screen of the same, and Fig. 6 is a side elevation of a cylindrical damper or draft-regulator or support for the said outer screen.

In said drawings, $a\ a$ indicate the outer casings of the warmer, which I prefer to make of sheet metal of the concavo-convex form shown in Figs. 2 and 3, the said casing when together producing a receptacle having a close resemblance to an ordinary watch-case. Said casings are hinged together, as at $b$, and are provided with a locking or catching device of any suitable construction, the one preferred being a spring $c$, having a catch projection $d$, adapted to engage a co-operating catch $e$ on the casing opposite to the one having said spring, the spring having a suitable thumb or finger-piece $f$ of any desired construction. The said casings are perforated, as at $g\ g$, to allow an inflow of pure air and an outflow of gas, and are centrally open or are provided with large central perforations $a^2$ to receive supplemental casing $a'\ a'$. These latter conform to the openings and fit closely therein, as indicated in Fig. 3, giving to the casings the appearance of integral plates. To one of the said supplemental casings is or may be secured a series of partitions or screens, which serve to give form to the fire or fuel box. The fuel-chamber $h'$ within said box is preferably of an annular shape and is formed of sieve-like walls or partitions $h\ i\ j$. Of these latter $h$ is a corrugated outer wall; $i$, a cylindrical inner wall having a chamber $k$ formed on the inside thereof to receive chemicals or medicinal compounds, or a receptacle $l$ for the same, and $j\ j$ are transverse partitions separable or removable in their relation to the partitions $h\ i$, so that when removed from position one cake of fuel may ignite the next cake.

The receptacle $l$ for medicinal compounds may consist of an annular piece of sheet metal having screw-threads formed thereon and secured by solder or otherwise to the supplemental case opposite the one having the partitions $h\ i\ j$. Outside of and around the corrugated partition forming the exterior of the fire or fuel chamber is secured a perforated screen $m$, which may serve to regulate or control the draft or the supply of air to the fire, a few perforations serving to limit the rate of consumption, a greater number allowing an increased supply of air and a more rapid consumption of fuel and a consequent increase in the production of heat. This said perforated circular plate $m$ also serves as a support or base-plate for an outer sieve-like structure. This screen may, and under some conditions does, hold the corrugated partition $h$ in place without the aid of solder or other means of fastening to the supplemental casing, the said corrugated partition, because of the resilience inhering in the steel wire forming said partition, bearing outwardly against the inner side of the screen, as will be well understood. On the outside of said screen $m$ is secured a fine wire fender or screen $n$ to prevent the escape of the very fine dust or ash resulting from combustion, the same said ash being thus retained within the fire-box until the same is opened.

The fuel which I employ in connection with the warmer is preferably of the following composition, in about the proportions stated: powdered charcoal, one ounce; silicate of soda, one tea-spoonful; saturated solution of nitrate of potash, one-half ounce. A mixture of plaster-of-paris and gum-tragacanth may be employed in lieu of the silicate of soda. This is compressed into cakes of a size to fit into and be held with compositive firmness within the fuel-chamber, the said cake having on the outer sides thereof projections conforming to the corrugated partition. The cakes are, of course, dried before using. The said cakes are also made in segments, and when together form nearly a continuous circle, as shown in Fig. 4. Being ignited the burning continues slowly until the whole is consumed. Should I desire a fire of shorter duration, I may interpose the transverse partitions $j$ between the cakes, which limit the combustion, and extinguish the fire at the end of the first cake, as will be understood. By withdrawing the partition the fire ignites the next cake and the warmth is thus continued. The cakes may be divided, as shown in Fig. 3, and thus where a continued fire is desired the cakes may be made to overlap at the vertical joints, and thus a lasting fire is insured. At one of the corrugated partitions I turn the same inward toward the central partition $i$, and thus covering the end of the opposite cake, preventing the same from igniting and starting a fire in the opposite direction.

By forming the large central openings in the casings $a\ a$ and projecting the supplemental casings $a'\ a'$ therethrough, as shown and described, I secure at the center of the device a more direct radiation of heat from the fire-box, the same not being interrupted by a second partition or diaphragm of sheet metal. Thus increased heat is applicable to the affected part. At the periphery of the device, however, the annular chamber $r$, in connection with the perforations $g\ g$, serves to reduce the temperature, so that the device may be readily and comfortably manipulated or handled.

The supplemental casing where it forms a part of the box $l$ may be perforated to readily allow of the escape of vapors arising from the medicinal or other compounds therein under the influence of the heat product of the consuming fuel.

What I claim as new is—

1. The improved portable warmer combining therein cases $a\ a$, open at the center, and a fire-box arranged between the cases and coinciding with said openings, substantially as and for the purposes set forth.

2. The improved warmer herein described, combining therein cases $a\ a$ and supplemental cases $a'\ a'$, having a fuel box or receptacle between, substantially as and for the purposes set forth.

3. The improved warmer herein described, combining therein concavo-convex cases open at the center and provided with perforations $g\ g$, supplemental cases, and interior perforated partitions forming with the supplemental cases a fire-box, substantially as and for the purposes set forth.

4. The improved warmer herein described, combining therein concavo-convex cases perforated near the periphery and provided therebetween with a perforated fire-box, substantially as set forth.

5. The improved warmer herein described, combining therein concavo-convex cases provided therebetween with a fuel-box having a perforated wall with recesses or corrugations for the reception of the fuel, substantially as set forth.

6. The improved warmer herein described, combining therein concavo-convex cases, a fire-chamber formed therebetween by partitions, and a cooling-chamber outside of said partitions, substantially as and for the purposes set forth.

7. The combination of casings $a\ a$, supplemental casings $a'\ a'$, one of which is perforated, a chemical or medicine chamber arranged on said supplemental casing adjacent to the perforations therein, and a fuel-chamber, said parts being arranged and adapted to operate substantially as and for the purposes set forth.

8. In combination, cases $a\ a$, supplemental cases $a'\ a'$, perforated and sieve-like partitions $m\ n$, and corrugated and annular partitions $h\ i$, all arranged and combined substantially as and for the purposes set forth.

9. The improved portable warmer combining therein concavo-convex cases $a\ a$, hinged, as at $b$, provided with perforations $g\ g$ and large central perforations $a^2\ a^2$, a catch $d\ e$, a fire-chamber having a corrugated or recessed wall to receive fuel conforming to said wall, substantially as and for the purposes set forth.

In testimony that I claim the foregoing I have hereunto set my hand this 27th day of December, 1889.

JONATHAN T. ELLIS.

Witnesses:
OSCAR A. MICHEL,
E. L. SHERMAN.